May 4, 1965 W. K. DOW 3,181,666
ACCELERATOR CONTROLLING DEVICE
Filed Feb. 19, 1962 2 Sheets-Sheet 1
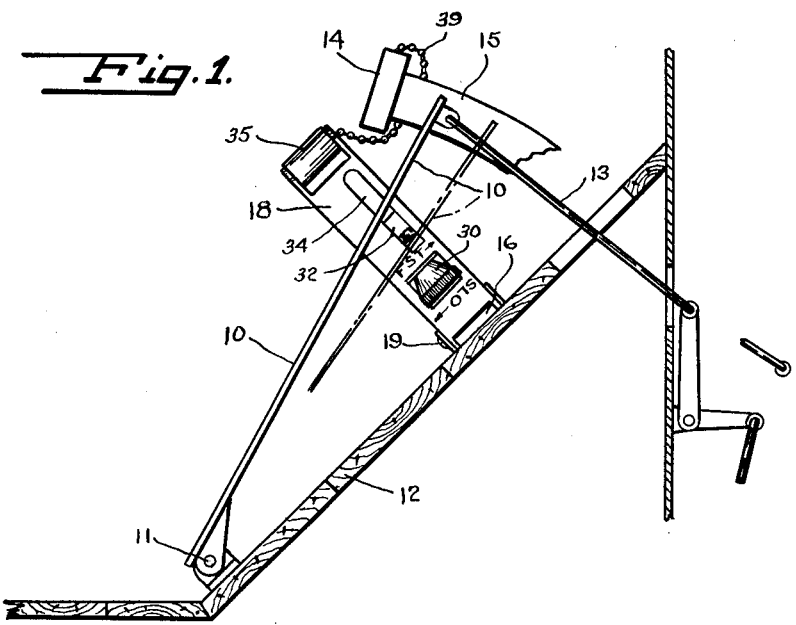
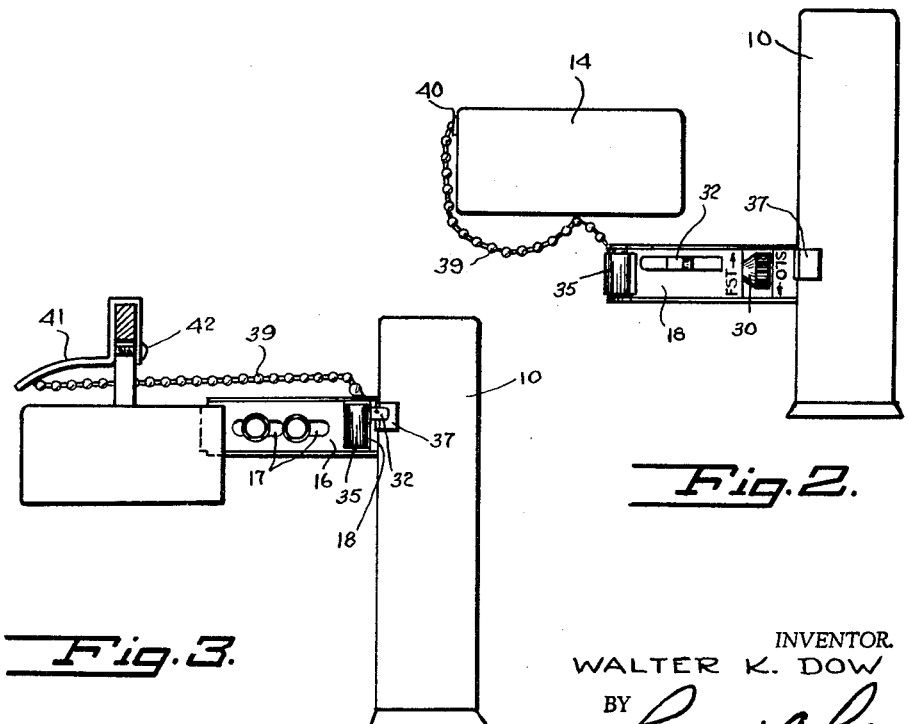
INVENTOR.
WALTER K. DOW
BY
Raymond A. Paquin
ATTORNEY.

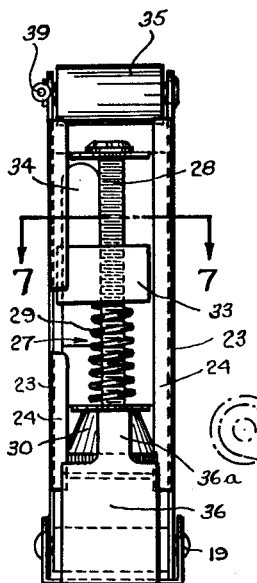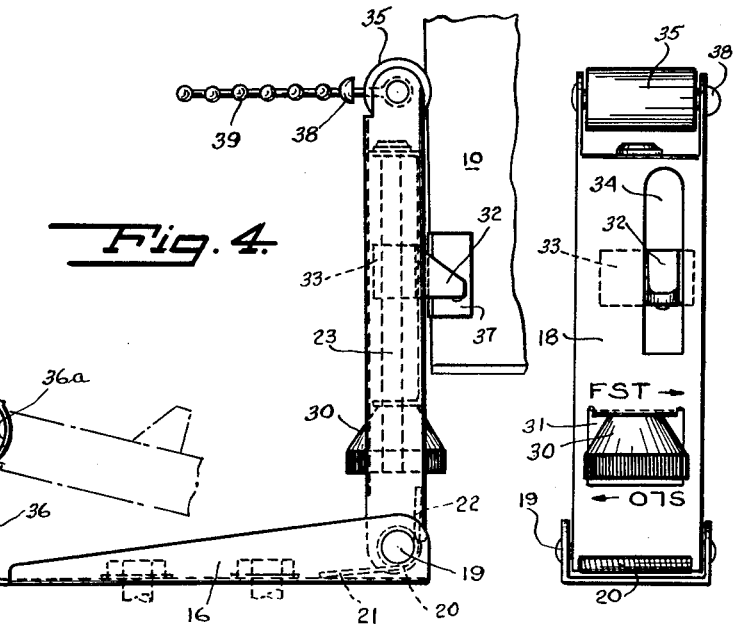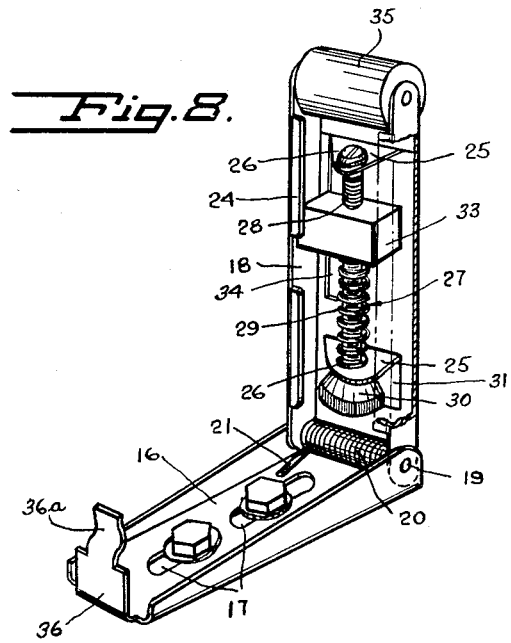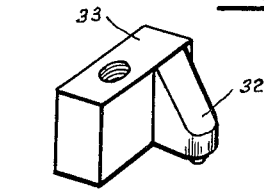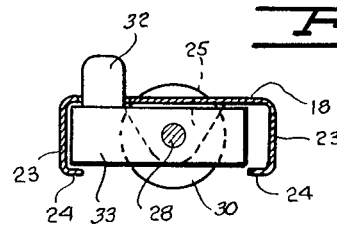

United States Patent Office 3,181,666
Patented May 4, 1965

3,181,666
ACCELERATOR CONTROLLING DEVICE
Walter K. Dow, Longmeadow, Mass. (% Dow Mechanical Corp., Thompsonville, Conn.)
Filed Feb. 19, 1962, Ser. No. 174,056
3 Claims. (Cl. 192—3)

This invention relates to a new and improved device for retaining the accelerator of a vehicle in predetermined position and thereby providing the vehicle with a fixed cruising speed without the necessity of the operator retaining his foot pressure on the accelator.

The primary object of this invention is to provide a new and improved device for retaining the accelerator of a vehicle in predetermined position and thereby to provide the vehicle with a fixed cruising speed without the necessity of the operator retaining his foot pressure on the accelerator of the vehicle; which new and improved device is an improvement over that disclosed and claimed by me in my Patent Number 2,787,918.

Other objects and advantages of the invention will be apparent from the following description taken in connection with the accompanying drawings. It will be understood that changes may be made in the details of construction and arrangement of parts without departing from the scope of the invention as set forth in the claims, as the preferred forms of the invention have been given by way of illustration only.

Referring to the drawings:

FIG. 1 is a side view showing the device of the present invention in operative position relative to a vehicle accelerator;

FIG. 2 is a top view of the form of invention shown in FIG. 1 adapted for use on a vehicle containing a power brake system relative to the vehicle accelerator and power brake pedal, said invention being in its out of service position;

FIG. 3 is a top view of the form of invention shown in FIG. 1 adapted for use on a vehicle containing a conventional brake system relative to the vehicle accelerator and brake pedal, said invention being in operative position;

FIG. 4 is a side view of the form of invention shown in FIGS. 1 through 3 in operative position;

FIG. 5 is a side view of the invention as shown in FIG. 4;

FIG. 6 is a side view of the invention as shown in FIG. 4 which side view is taken from the side opposite to that shown in FIG. 5;

FIG. 7 is a sectional view taken on line 7—7 of FIG. 5 looking in the direction of the arrows;

FIG. 8 is a perspective view of the form of invention shown in FIGS. 1 through 7 with one flange of said invention being cut away to show the interior of said invention; and FIG. 9 is a perspective view of the hook means.

Referring more particularly to the drawing wherein similar reference characters designate corresponding parts throughout, the device shown is adapted for use with a vehicle accelerator 10 which is pivotally mounted at 11 on the floor 12 of the vehicle and is adapted through rod 13 to control the quantity of fuel supplied to the vehicle engine to thereby control the speed of the vehicle and also with a vehicle brake pedal 14 attached through linkage 15 to the braking system of the vehicle.

During the operation of the vehicle on the open road over long periods of time, the operator's foot and leg which must be maintained in a set position for such long periods of time, often becomes tired thereby causing discomfort to the operator. In order to overcome the necessity for the operator to retain his foot in a set position on the accelerator for such long periods of time, I have provided a device which will return the accelerator in predetermined position and which is adjustable whereby the operating speed or set cruising speed of the vehicle may be predetermined.

The apparatus of the present invention comprises a base 16 which is adapted to be secured to the floor 12 of a vehicle by means of bolts or other securing means through the openings 17. The arm 18 is pivotally mounted relative to base or support 16 by the pivot or hinge 19 which is spring loaded by the spring 20 which is wound on pivot 19 and has its opposite ends 21 and 22 engaging base 16 and arm 18 relatively and tending to urge said arm 18 away from said base and towards the accelerator 10 as hereinafter described.

The arm 18 is provided with the oppositely disposed flanges 23, said flanges being each provided with the inturn lip 24.

Said arm 18 is further provided with flanges 25 adjacent to its upper and lower ends; said flanges 25 each being equipped with a hole means 26 in order to retain adjustment means 27 in position by means of a screw member 28 passing through said hole means 26.

The adjustment means 27 are comprised of said screw member 28 mounted in said hole means 26 of arm 18, said screw member being encased within a spring means 29; said spring means 29 positioned on said screw member to facilitate adjustment of the device; an adjusting ball 30 being connected to said screw member 28 immediately below the passage of said screw member through the lower hole means 26 in the flange 25 of arm 18 and extending through a slot 31 in said arm 18 for purposes of adjustment of the device; and a member 33 mounted upon said screw member 28 and said spring means 29, said member 33 having mounted upon it an engaging member or hook 32, said member 33 being mounted upon said screw member 28 and said screw means 29 for lateral movement thereupon upon the adjustment of the adjusting ball 30, with said member 33 capable of being locked in position to provide a predetermined or desired speed of the vehicle by means of the action of spring means 29 on screw member 28 upon the adjusting of adjusting ball 30.

A slot 34 is provided in arm 18 through which engaging member or hook 32 of adjustment means 27 extends. The top of the hook, as shown, is angled downwardly and will act as a cam slide if the foot comes in contact with the hook in pressing the accelerator. In addition to this, it is so placed at the forward side of the arm that the normal position of the foot on a vehicle accelerator will push the arm away from the accelerator so that said accelerator can be operated by the foot pressure of the driver of the vehicle.

However, due to the positioning of said hook a slight movement by the driver of his foot to the right will permit the hook to engage the accelerator and retain it in any preset position without the necessity of the foot pressure of the driver of the vehicle.

Thus, as is shown in FIGS. 1, 2, 6, and 8 the slot 34 having the hook 32 is provided off center on arm 18 in such direction that it will be at the forward side of the arm when the device is mounted on a vehicle adjacent to the accelerator. The arm 18 is of sufficient width as to have the member 34 mounted for adjustment relative thereto and which is readily adjustable for holding the accelerator in the position necessary for any desired cruising speed.

The arm 18, as previously described, is pivotally connected to base 16 to form a simple hinge type, spring loaded device for fastening to the floor of the vehicle adjacent to the accelerator with the hinged arm 18 of sufficient length to protrude or extend above the accelerator 10 and this arm 18 is provided with a roller 35 pivotally connected to said arm at its upper end.

The arm 18 is so positioned that the side of the operator's foot will cause engagement of it when the foot is in normal operating position, and the arm 18 is in upright position as shown in the drawings and the slight spring pressure will always maintain the arm 18 against the accelerator or the operator's foot when his foot is in normal driving position. Furthermore, the hinged arm 18 of the device is so designed that in the event the operator does not want to use the device, as for heavy city traffic or in congested areas, the arm 18 can be closed by pivoting it against the base 16 and the roller 35 will engage the lock member 36 and retain the arm 18 in the position shown in broken lines in FIG. 4 and thus, retain the device out of operating position. It is pointed out that the locking portion 36a of the locking device 36 is spaced upwardly from the base 16 as shown in FIG. 4 and thus allows the operator to place the side of his shoe beneath the roller 35 for moving the arm 18 to operative position.

A wear clip 37 may be positioned upon the accelerator 10 between said accelerator and the hook 32 in order to prevent wear to said accelerator 10. Said wear clip 37 may be attached to the accelerator 10 by clamping or other similar means.

Adjacent to the roller 35 at the top end of arm 18 is located a chain connector 38 provided with means suitable to receive a chain or similar connector 39. Said chain 39 connects the arm 18 of the device to the brake pedal 14 of the vehicle in which the device is installed.

This chain 39 is shown in the drawings connected to the brake pedal in two manners, one in FIG. 2 and one in FIG. 3.

FIG. 2 illustrates a method of installation possible in most vehicles containing a power brake system. In such vehicles, the chain 39 is connected to the power brake pedal 14 by means of a screw or other similar fastener 40 at the farthest end of said brake pedal from the accelerator of the vehicle, with the chain 39 passing under the brake pedal 14 to such fastening point.

FIG. 3 illustrates a method of installation possible on most vehicles containing a conventional brake system. On such vehicles, the height of the brake pedal from the vehicle floor is often greater than on vehicles containing power brake systems. Thus, on these former vehicles, it is often possible that the device be placed further up on the accelerator than is possible in many vehicles containing power brake systems, as in these latter type vehicles, if the device is so placed, the lowness of the brake pedal often interferes with the movement of the arm 18. Thus, in vehicles having conventional brake systems and elsewhere where it is possible the chain 39 may be connected to a clip 41 attached to the linkage 15 of the brake system of the vehicle, said clip being attached to said linkage 15 through the use of a screw or similar fastener 42.

In either installation, the chain 39 is cut to such a length that, when the arm 18 of the device is in its normal operative position, said chain is of such a length that a very slight movement of the brake pedal 14 is all that is required to, through the action of said movement of said brake pedal on chain 39, pull the arm 18 of the device from the accelerator 10 of the vehicle and, hence, to pull said arm 18 from its operative to an out of service position. Thus, I have provided a safety device to disengage the accelerator controlling device, the operation of which safety device requiring that the operator of the vehicle exert only slight pressure upon the brake pedal of said vehicle.

In normal operation, when it is desired to employ the device, the operator places the side of his foot under the roller 35 and releases the arm 18 from the locking position 36a of the locking device 36 and the force of the spring 20 will then urge the arm 18 to a position where it engages the side of the accelerator 10. When the accelerator pedal has been depressed to a position beneath the position of the hook 32, the accelerator pedal, in depressing to this position, will ride over the upper cam surface of the hook 32 and push the arm 18 out of the way and then the force of the spring hinge will cause hook 32 to engage the upper surface of the accelerator pedal 10 to retain it in fixed predetermined position for providing desired cruising speed for the vehicle.

Should the operator desire to override the act of the device by placing his foot on the accelerator pedal, the side of the foot will engage the side of the arm 18 and urge the device out of operative position during such time as the operator has his foot on the accelerator pedal and then by depressing the accelerator pedal to the position beneath the hook 32 the device is placed in operative position.

When the device is in use on the open road, the foot bearing on the accelerator will also push the hinge far enough away from the accelerator so that the hook will not engage the accelerator and the accelerator can be pushed downwardly or released at will without interference of the device and the edge of the sole or shoe will ride up and down on the arm 18 without any difficulty and, thus, the vehicle will be controlled in the normal manner.

If the operator wishes to remove his foot from the accelerator, he merely presses the accelerator downwardly beyond the predetermined setting of the hook 32, slides his foot sideways away from the arm 18 and the accelerator pedal is retained at the setting for the desired vehicle speed. By swinging his foot back into normal operating position, the device is disengaged and the vehicle is operated in the normal manner.

On approaching a congested area or at the driver's decision to cease use of the device, a slight movement of the foot will snap the device to the floor out of operating position and likewise a slight movement of the foot can release it to useful or operative position when the operator wishes to use it.

Furthermore, should the operator be required, or desire, to brake his vehicle while the device is in its operative position, the slightest pressure of his foot on the brake pedal will exert a pulling force upon the arm of the device through the connecting chain such that the device will be out of operation even before sufficient pressure is exerted on the brake pedal to enable the brakes of the vehicle to take hold. Then, when the operator releases the brake pedal and again desires to regain his normal speed, the arm of the device will revert to its operative position.

From the foregoing, it will be seen that I have provided new and improved means for obtaining all of the objects and advantages of the invention.

I claim:

1. In a device of the character described, a base adapted to be secured to the floor of a vehicle or the like, an arm pivotally connected to said base and having a slot therein, an adjustable means carried by said arm and having a catch portion protruding through said slot and adapted to engage an accelerator pedal for retaining said accelerator pedal in desired adjusted position, said adjustable means comprising a threaded member carrying said catch member and an adjusting member operatively connected with said threaded member for adjusting the position of said catch member to desired position.

2. In a device of the character described, a base adapted to be secured to the floor of a vehicle or the like, an arm pivotally connected to said base and having a slot therein, an adjustable means carried by said arm and having a catch portion protruding through said slot and adapted to engage an accelerator pedal for retaining said accelerator pedal in desired adjusted position, said adjustable means comprising a threaded member carrying said catch member and an adjusting member operatively connected with said threaded member for adjusting the position of said catch member to desired position, said arm having a second slot and said adjusting member having a portion extending through said slot.

3. In a device of the character described, a base adapted to be secured to the floor of a vehicle or the like, an arm pivotally connected to said base and having a slot therein, an adjustable means carried by said arm and having a catch portion protruding through said slot and adapted to engage an accelerator pedal for retaining said accelerator pedal in desired adjusted position, said adjustable means comprising a threaded member carrying said catch member and an adjusting member operatively connected with said threaded member for adjusting the position of said catch member to desired position, and connecting means connecting the arm to the brake pedal of a vehicle whereby pressure on the brake pedal will release said catch member from the accelerator.

References Cited by the Examiner

UNITED STATES PATENTS

| | | | |
|---|---|---|---|
| 2,503,802 | 4/50 | Coutcher | 192—3 |
| 2,624,433 | 1/53 | Godbout | 192—3 |
| 2,670,822 | 3/54 | Reilly | 74—513 X |
| 2,787,918 | 4/57 | Dow | 74—513 X |

BROUGHTON G. DURHAM, *Primary Examiner.*